(12) United States Patent
Lin (10) Patent No.: US 10,466,094 B2
(45) Date of Patent: Nov. 5, 2019

(54) METHOD AND SYSTEM TO TRACK WEIGHT WITHOUT STEPPING ON A WEIGHT SCALE

(71) Applicant: Daniel Lin, San Francisco, CA (US)

(72) Inventor: Daniel Lin, San Francisco, CA (US)

(*) Notice: Subject to any disclaimer, the term of this patent is extended or adjusted under 35 U.S.C. 154(b) by 0 days.

(21) Appl. No.: 16/150,245

(22) Filed: Oct. 2, 2018

(65) Prior Publication Data

US 2019/0033122 A1  Jan. 31, 2019

Related U.S. Application Data

(63) Continuation-in-part of application No. 14/708,218, filed on May 9, 2015, now abandoned.

(60) Provisional application No. 61/991,327, filed on May 9, 2014.

(51) Int. Cl.
| | | |
|---|---|---|
| *G01G 19/44* | (2006.01) | |
| *G01G 19/52* | (2006.01) | |
| *G01G 23/37* | (2006.01) | |

(52) U.S. Cl.
CPC ........... *G01G 19/445* (2013.01); *G01G 19/52* (2013.01); *G01G 23/3735* (2013.01)

(58) Field of Classification Search
CPC ...... G01G 19/445; G01G 19/52; G01G 23/18; G01G 23/3735; G01G 23/3742
USPC ...................................................... 177/25.19
See application file for complete search history.

(56) References Cited

U.S. PATENT DOCUMENTS

| | | | |
|---|---|---|---|
| 5,092,415 A | 3/1992 | Asano | |
| 5,269,388 A * | 12/1993 | Reichow | G01G 19/445 177/144 |
| 5,393,935 A | 2/1995 | Hasty et al. | |
| 5,780,781 A | 7/1998 | Berger et al. | |
| 6,468,234 B1 | 10/2002 | Van der Loos et al. | |
| 7,714,238 B2 | 5/2010 | Skinner et al. | |
| 7,989,713 B2 | 8/2011 | Hulburt et al. | |
| 8,362,903 B2 * | 1/2013 | Lindh | A61B 5/0002 340/573.1 |
| 8,475,367 B1 * | 7/2013 | Yuen | G06F 19/3418 600/300 |
| 8,598,893 B2 | 12/2013 | Camus | |
| 8,639,226 B2 | 1/2014 | Hutchings et al. | |
| 2003/0111275 A1 * | 6/2003 | Sternberg | G01G 19/445 177/144 |

(Continued)

FOREIGN PATENT DOCUMENTS

WO   WO2004006768   1/2004

OTHER PUBLICATIONS

"Bedscales Launches to Enthusiastic Kickstarter Debut" PRWeb, Posted Oct. 30, 2013, Visited Oct. 28, 2018 (https://www.prweb.com/releases/bedscales/kickstarter-launch/prweb11278616.htm).

(Continued)

*Primary Examiner* — John Villecco (57) ABSTRACT

Embodiments herein provide systems and methods tracking the weight of an individual who is lying in bed. One method generally includes periodically receiving weight data from a weight data sensor that is situated within the bed, wherein the weight data sensor has recognized a change in weight on the bed from a default weight of the bed, and providing to the individual a user interface to track weight patterns of the individual based on the received weight data.

20 Claims, 5 Drawing Sheets

(56) References Cited

U.S. PATENT DOCUMENTS

| | | | |
|---|---|---|---|
| 2004/0020694 A1* | 2/2004 | Hall | G01G 19/445 177/144 |
| 2004/0124017 A1* | 7/2004 | Jones | G01G 19/445 177/144 |
| 2005/0190068 A1 | 9/2005 | Gentry et al. | |
| 2006/0028350 A1* | 2/2006 | Bhai | A61B 5/1115 340/666 |
| 2007/0180047 A1* | 8/2007 | Dong | A61B 5/1171 709/217 |
| 2007/0191742 A1 | 8/2007 | Park | |
| 2008/0097250 A1* | 4/2008 | Tochigi | A61B 5/024 600/595 |
| 2008/0235872 A1 | 10/2008 | Newkirk et al. | |
| 2009/0121826 A1 | 5/2009 | Song et al. | |
| 2010/0225489 A1* | 9/2010 | Hinterlong | A61B 5/103 340/573.4 |
| 2010/0299840 A1* | 12/2010 | Brauers | A61B 5/1126 5/658 |
| 2012/0053423 A1 | 3/2012 | Kenalty et al. | |
| 2012/0053424 A1* | 3/2012 | Kenalty | A61B 5/0015 600/300 |
| 2012/0122430 A1* | 5/2012 | Hutchings | G01G 19/44 455/414.1 |
| 2013/0074262 A1* | 3/2013 | Receveur | G01G 5/006 5/600 |
| 2014/0039351 A1* | 2/2014 | Mix | A61B 5/1114 600/587 |
| 2014/0063180 A1* | 3/2014 | Sharma | G08C 19/00 348/36 |
| 2014/0083779 A1* | 3/2014 | Sharma | G01G 19/44 177/1 |
| 2014/0142396 A1* | 5/2014 | Ricks | A61B 5/0537 600/301 |
| 2015/0101870 A1* | 4/2015 | Gough | G01G 3/141 177/211 |
| 2015/0107910 A1* | 4/2015 | Villard | G01G 19/4146 177/25.12 |
| 2015/0164238 A1 | 6/2015 | Benson et al. | |
| 2016/0033319 A1* | 2/2016 | Kovacs | G01G 19/44 177/25.13 |
| 2016/0299001 A1* | 10/2016 | Petrucelli | A61B 5/0537 |
| 2016/0327426 A1 | 11/2016 | Nachigal et al. | |
| 2017/0003159 A1 | 1/2017 | Kostic et al. | |
| 2017/0143282 A1* | 5/2017 | Kovacs | G01G 19/50 |
| 2017/0146389 A1* | 5/2017 | Kovacs | G01G 19/50 |
| 2017/0148240 A1* | 5/2017 | Kovacs | G01G 23/36 |
| 2018/0035918 A1* | 2/2018 | Emalfarb | G01G 19/44 |

OTHER PUBLICATIONS

Mayne, Mark, "Withings Aura sleep system launched", T3: The Gadget Website, Posted Jan. 8, 2014, Visited Oct. 28, 2018 (https://www.t3.com/news/withings-aura-sleep-system-launched).

* cited by examiner

METHOD AND SYSTEM TO TRACK WEIGHT WITHOUT STEPPING ON A WEIGHT SCALE

CROSS-REFERENCE TO RELATED APPLICATIONS

The present application is a continuation-in-part of and claims the benefit of patent application Ser. No. 14/708,218, filed on May 9, 2015 and entitled "Method and System to Track Weight Without Stepping on a Weight Scale," which claims the benefit of U.S. provisional patent application 61/991,327 filed May 9, 2014 and entitled "Method and System to Track Weight Without Stepping on a Weight Scale," the entirety of which are all hereby incorporated by reference.

BACKGROUND

Modern day body weight scales not only measure a user's weight but also his body mass index (BMI), body fat, water weight, hydration percentage, heart rate, bone mass, air quality and various other health-related measurements (e.g., all such measurements generally referred to as "weight data" herein). These scales also store such weight data and enable an individual to track and analyze historical measurements. For example, the scales may include Bluetooth and/or Wi-Fi connectivity that enable them to communicate weight data to a corresponding software application (e.g., developed by a the scale's manufacturer or a partner thereof) running on the individual's computer system or mobile device, or to a corresponding service hosted by a third party (e.g., such as the scale's manufacturer) and accessible through the Internet (e.g., through a web application accessed through a browser) that stores the weight data, provides analytics on the weight data (e.g., to provide historical trends information and/or health advice to the individual), and provides a rich user interface for the user to interact with his weight data to gauge his overall health.

Despite the sophistication of these weight scales, many users do not use a weight scale consistently. Users typically experience some phases where they are more health conscious and are more likely to track their weight using a weight scale and other phases where they are less focused on health and are less likely to use the weight scale. Unfortunately, it is during the phases when users as less health conscious (e.g., and therefore are not tracking weight data) that weight and other health related attributes (that may be measured or indicated by weight data) may deteriorate and that the tracking of weight data would have otherwise provided an indication of such deterioration and/or encouragement to improve health.

SUMMARY

Systems and methods for tracking weight data of an individual while the individual is lying in bed, for example, to go to sleep at the end of each day are disclosed herein. By tracking the weight data for an individual while he is sleeping, the individual does not need to consciously weigh himself every time he is interested in learning about his weight. Since the individual often goes to sleep in the same bed every night, his weight will be automatically measured without his conscious involvement.

A weight data sensor situated within the bed silently tracks the individual's weight every time he goes to bed and periodically transmits weight data to a hosted service (in one embodiment) that stores the weight data, performs analytics on the weight data and provides the individual a user interface (e.g., a web application, installed applications on the individual's devices, etc.) to track his weight patterns over time. In certain embodiments, the individual may also wear a fitness device that transmits other health-related data to the hosted service, such as heart rate, so that the hosted service can compare the other health-related data to past measurements (e.g., past heart rates while sleeping) that correspond to past weight measurements of the individual to confirm that the received weight data relates to the individual. The weight data sensor may disregard weight measurements if the fitness device is not located proximate to the weight data sensor and is not actively taking other-health related measurements of the individual.

In this manner, when the individual is interested in understanding his weight patterns, he need only log into the hosted service to see his weight and does not need at that time to step on a weight scale, which may or may not be available at that time. Furthermore, the ability to silently and unconsciously track the individual's weight also enables the hosted service to provide alerts to the individual in the event of too much weight loss or gain during a phase where the individual may not be consciously weighing himself to track such loss or gain.

DETAILED DESCRIPTION

Figure 1:
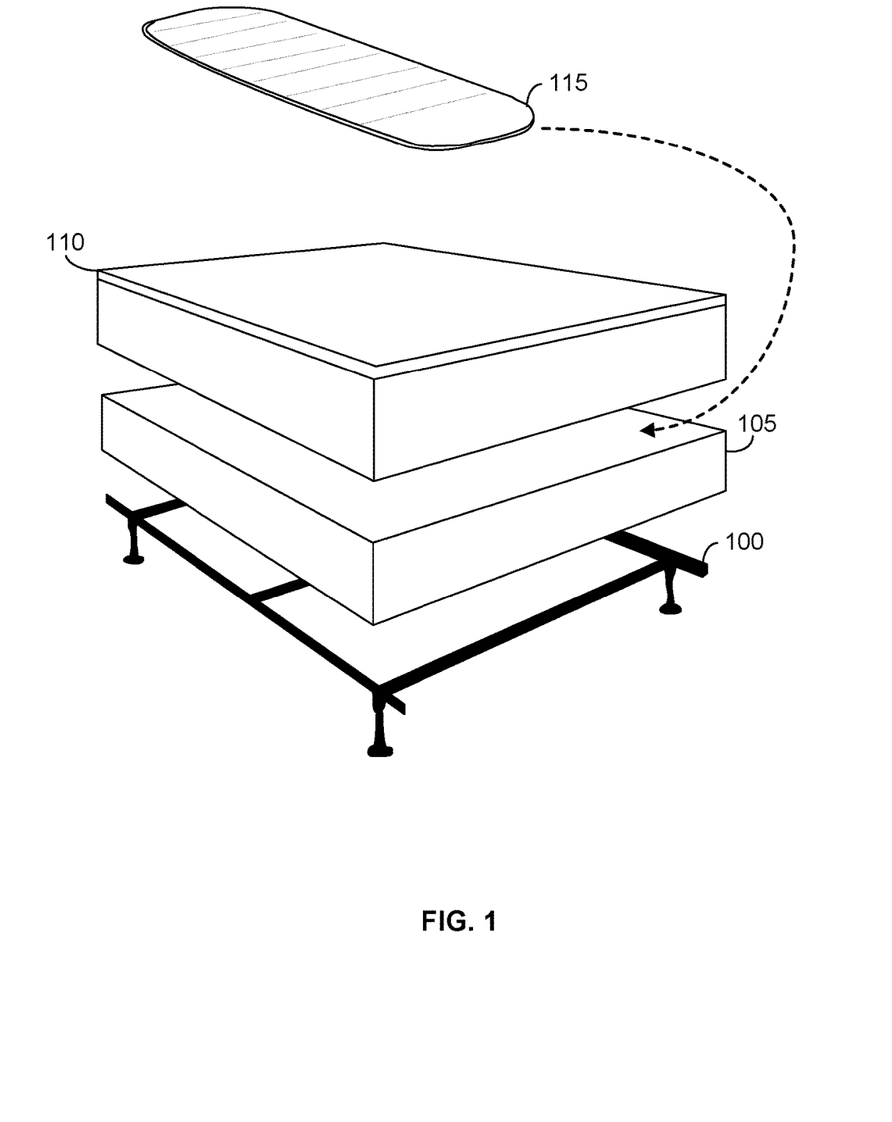
FIG. 1 depicts a weight data sensor that can be inserted underneath a mattress in accordance with one embodiment of the invention.

FIG. 1 depicts a weight data sensor that can be inserted underneath a mattress in accordance with one embodiment of the invention. A bed frame 100 supports a box spring 105 and a mattress 110. A weight data sensor 115 can be inserted underneath mattress 110, for example, between box spring 105 and mattress 110. As depicted in the embodiment of FIG. 1, weight data sensor 115 may take the form of an elongated pad that is long enough to experience an individual's full weight when the individual is lying on the bed, although it should be recognized that alternative form factors for weight data sensor 115 may be used consistent with the teachings herein. In addition to weight data, weight data sensor 115 may also be able to be able to monitor sleep patterns such as body movements, breathing cycles, heart rate, REM sleep patterns, deep sleep patterns, restless sleep patterns, etc.). Weight data sensor 115 may include Bluetooth, Wi-Fi or other radio wave or wireless communication capabilities that enable weight data sensor 115 to communicate with a local area network (LAN), a local computing device or with the Internet generally. In certain embodiments, weight data sensor 115 includes batteries or a power cord to plug into a nearby electric socket to provide power to drive the wireless communication capabilities and other digital functionality. Weight data sensor 115 also includes sensors to measure the weight (as well as other weight data in certain embodiments) of an individual when the individual is lying on mattress 110. For example, embodiments of a weight data sensor 115 may include a number of strain gauges (e.g., within a Wheatstone bridge, etc.) or other types of load cells (e.g., pneumatic, hydraulic, etc.) that measure compressive resistance change when an individual lies on mattress 110 and transmits a signal to a CPU or other circuit in weight data sensor 115 which convert the signal into a weight measurement. In certain embodiments, weight data sensor 115 may utilized air bladders to recognize change in pressure when an individual lies on the bed. It should be recognized that there are a number of ways to design the form factor as well as the weight-measuring mechanisms of weight data sensor 115 in order to accurately measure an individual's weight when the individual lies on mattress 110.

Figure 2:
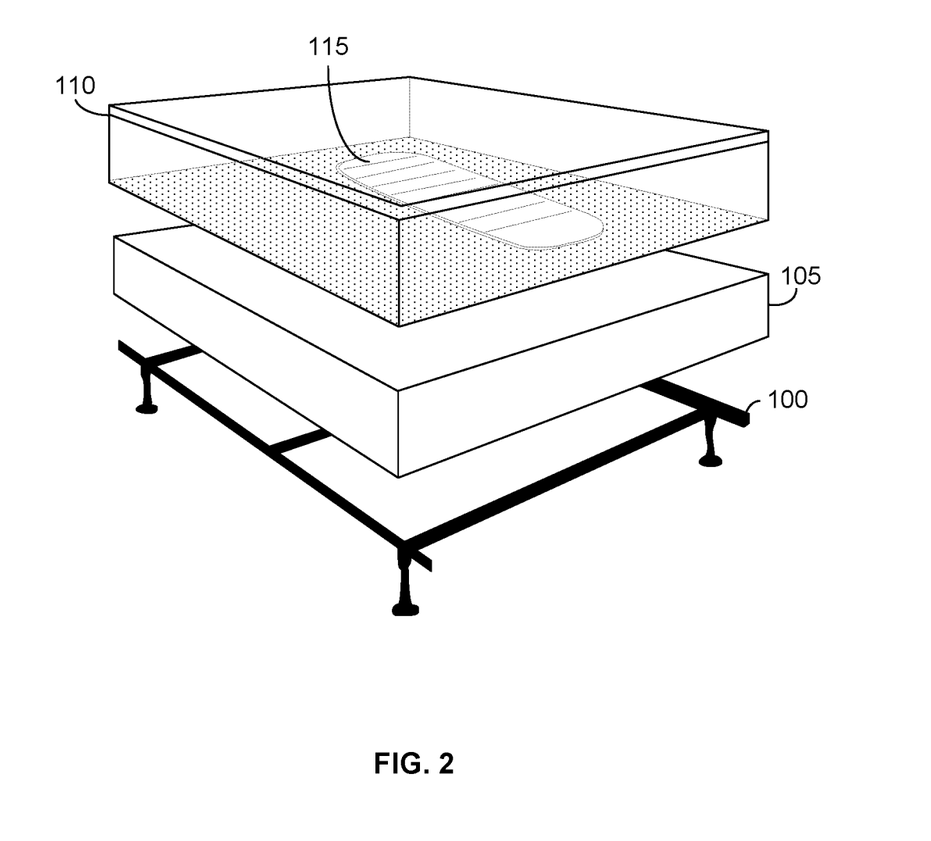
FIG. 2 depicts a weight data sensor that is embedded into a mattress in accordance with one embodiment of the invention.

FIG. 2 depicts an alternate embodiment of weight data sensor 115 that is embedded into mattress 110 in accordance with one embodiment of the invention. In one embodiment, mattress 110 may be an adjustable air mattress that utilizes air chambers and the load cells of weight data sensor 115 are incorporated as part of the air chamber mechanism such that the load cells experience compressive resistance change (e.g., to measure an individual's weight) in response to changes in the air pressure of the air chamber (as opposed to a separate elongated pad or similar insert as depicted in FIG. 2).

Figure 3:
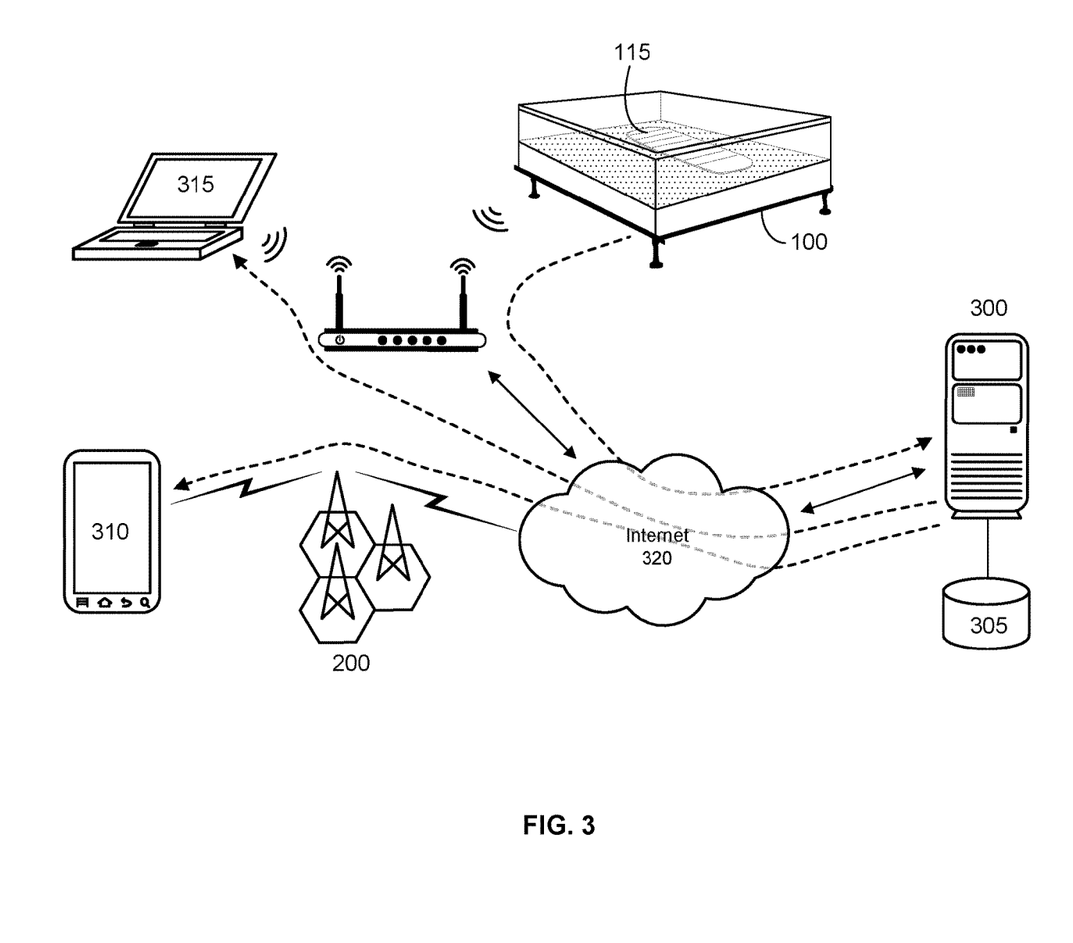
FIG. 3 depicts an communication architectures for obtaining data from a weight data sensor in accordance with one embodiment of the invention.

FIG. 3 depicts a communication architecture for obtaining data from a weight data sensor in accordance with one embodiment of the invention. In the embodiment of FIG. 3, weight data sensor 115 in bed frame 100 wirelessly communicates over a LAN's Wi-Fi network through the Internet 320 to a hosted service 300 that stores weight data collected by weight data sensor 115 in database 305. Hosted service 300 stores the weight data collected by weight data sensor 115, performs analytics on the weight data and presents such weight data and analytics to the individual through a user interface, for example, through a web application accessible on a web browser (e.g., on laptop 310 or mobile device 315) or through an application installed on laptop 305 or mobile device 310. In an alternative embodiment, weight data sensor 115 in bed frame 100 may wirelessly communicate over a Bluetooth connection established with a user's laptop or mobile device (e.g., smartphone, tablet, etc.), which in turn, transmits weight data collected by weight data sensor 115 to hosted service 300 (e.g., through the LAN's Wi-FI network and through the Internet). In certain embodiments, hosted service 300 may also receive other health-related data from other devices. For example, fitness bands or similar devices worn on the body of the individual may transmit heart rate, body temperature, ambient temperature, calories burned, steps walked, sleep patterns, location-based data and other data to hosted service 300 which can than combine such data with weight data collected from weight data sensor 115 and perform analytics thereon including as further discussed below. Such other health-related data is also stored in database 305, in addition to the weight data stored in database 305.

Figure 4:
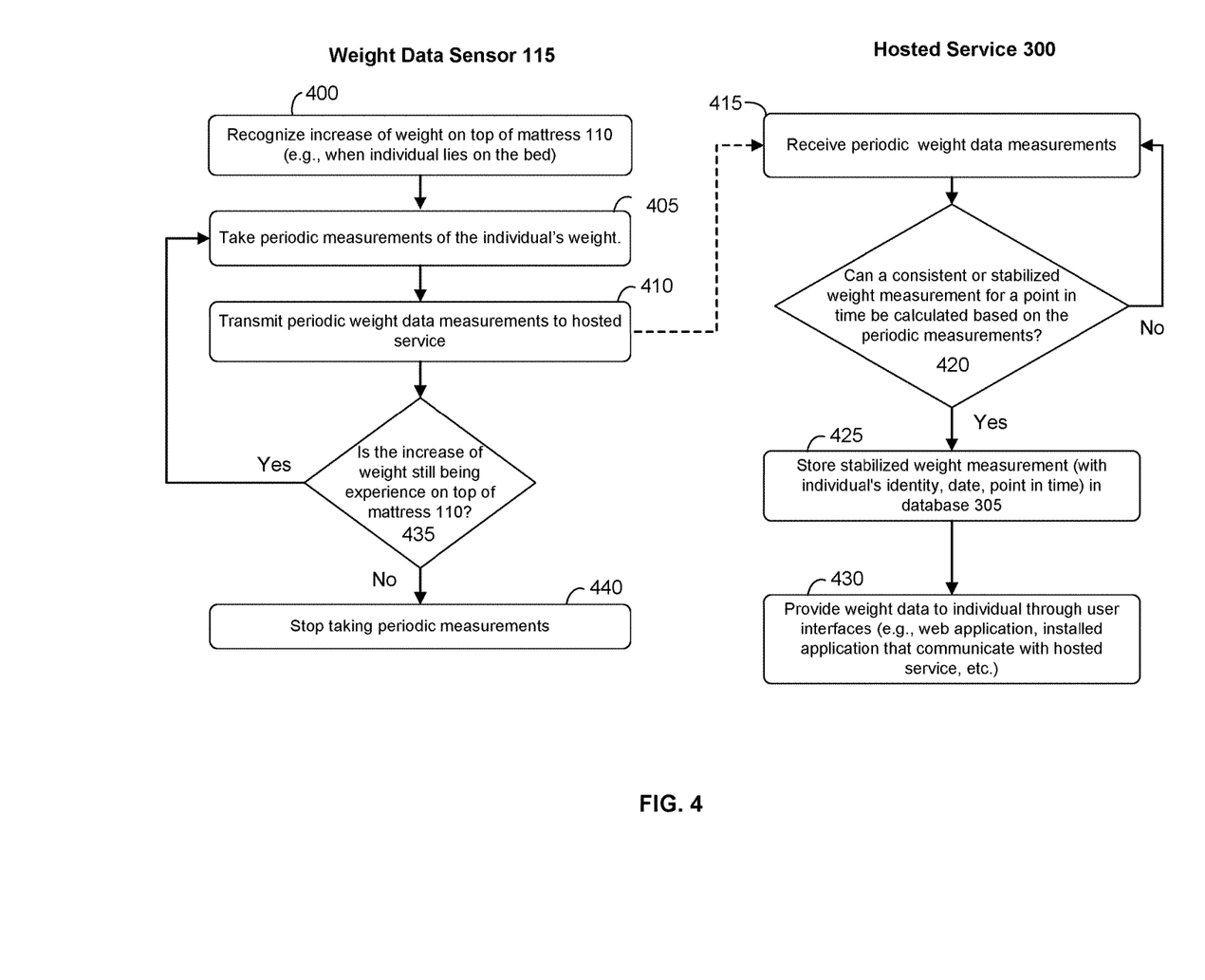
FIG. 4 depicts a flow chart for obtaining data from a weight data sensor in accordance with one embodiment of the invention.

FIG. 4 depicts a flow chart for obtaining data from a weight data sensor in accordance with one embodiment of the invention. In step 400, weight data sensor 115 recognizes an increase of weight on top of mattress 110 due, for example, to an individual going to bed for the evening. In step 405, weight data sensor 115 may begin to take periodic measurements (e.g., every 30 seconds, every minute, every 5 minutes, every 30 minutes, or any similar period depending on embodiment) of the weight of the individual in order to calculate an accurate measurement of the individual's weight based on multiple measurements. The individual may need to fall asleep or otherwise stop moving on mattress 110 before weight data sensor 115 can determine or otherwise calculate a consistent and/or stabilized weight of the individual. In step 410, weight data sensor 115 transmits the individual's weight measurements to hosted service 300, which receives them in step 415. In the embodiment of FIG. 4, these transmitted weight measurements are the raw periodic measurements taken by weight data sensor 115. In step 420, hosted service 300 then performs heuristics and/or calculations to smooth the raw periodic measurements and determine whether a consistent and/or stabilized weight of the individual can be determined for a particular time based on the raw measurements. If, in step 420, a stable weight can be determined, then in step 425, hosted service 300 stores the stable weight measurement in database 305 in association with the individual's identity and the date (and possibly the particular time) and in step 430, provides such weight information to the individual through the user interface (e.g., web application, installed application on individual's device) as previously discussed. In certain embodiments, hosted service 300 is able to determine, based on comparisons with historic data (e.g., both weight data or other health-related data) stored in database 305, whether the determined weight is related or unrelated to the individual if, for example, multiple persons may sleep on mattress 110. In one example, if historic weight measurements are significantly different from the determined weight, hosted service 300 determines that the weight is unrelated to the individual. In certain embodiments, hosted service 300 may also receive other health-related data from other devices worn on the individual at generally the same time that weight measurements are received in step 415. If the received health-related data, such as a heart rate measurement from a fitness device worn by the individual, is significantly different than the historic measurements of the individual's heart rate while the individual is sleeping (as stored in database 305), then hosted service 300 could determine that the received weight measurement from weight data sensor 115 is unrelated to the individual (e.g., the individual is not sleeping in the bed, but rather actively awake elsewhere). In other embodiments, weight data sensor 115 may recognize when a fitness device that is worn by the individual is in close proximity to weight data sensor 115 (e.g., using proximity technologies such as Bluetooth or other similar radio communication technologies) and report such recognition to hosted service 300. If the fitness device is actively reporting other health-related data of the individual to hosted service 300 but is not in proximity to weight data sensor 115 when the determined weight is received in step 115, hosted service 300 may conclude that the determined weight is unrelated to the individual. In alternative embodiments, if the fitness device is not taking active measurements from the individual and is not in proximity to weight data sensor 115, weight data sensor 115 does not send any weight measurements to hosted service 305 in step 410. In yet other embodiments, weight data sensor 115 may recognize whether the individual's mobile device (such as a smart phone) is proximate to it before transmitting weight measurements to hosted service 300.

Similarly, hosted service 300 may, in step 425, disregard raw data measurements that cannot be smoothed to generate a stable weight or are otherwise inconsistent with past measurements for the individual (e.g., a pet has jumped onto the bed, a guest is sleeping on the bed, etc.) In the embodiment of FIG. 4, in step 435, if weight data sensor 115 continues to experience the increased weight of the individual (e.g., while the individual is sleeping throughout the night), the flow will return to step 405 and continue to take measurements until the increased weight has been removed (or otherwise stop taking the measurements in step 440). It should be recognized that alternative flows for obtaining data from a weight data sensor in accordance with embodiments different from FIG. 4. For example, rather than having hosted service 300 perform the calculations on the raw periodic weight data measurement in step 420, in alternative embodiments, weight data sensor 115 may itself perform such calculations (and related smoothing techniques) and determine a stable weight for a particular point in time prior to transmitting the stable weight data to hosted service 100. Similarly, in alternative embodiments, weight data sensor 115 may transmit the weight data (either raw or stabilized) to a corresponding application running on a local device, such as laptop 310 or mobile device 315 (e.g., via Bluetooth, etc.) which in turn transmits the received data to hosted service 300.

Figure 5:
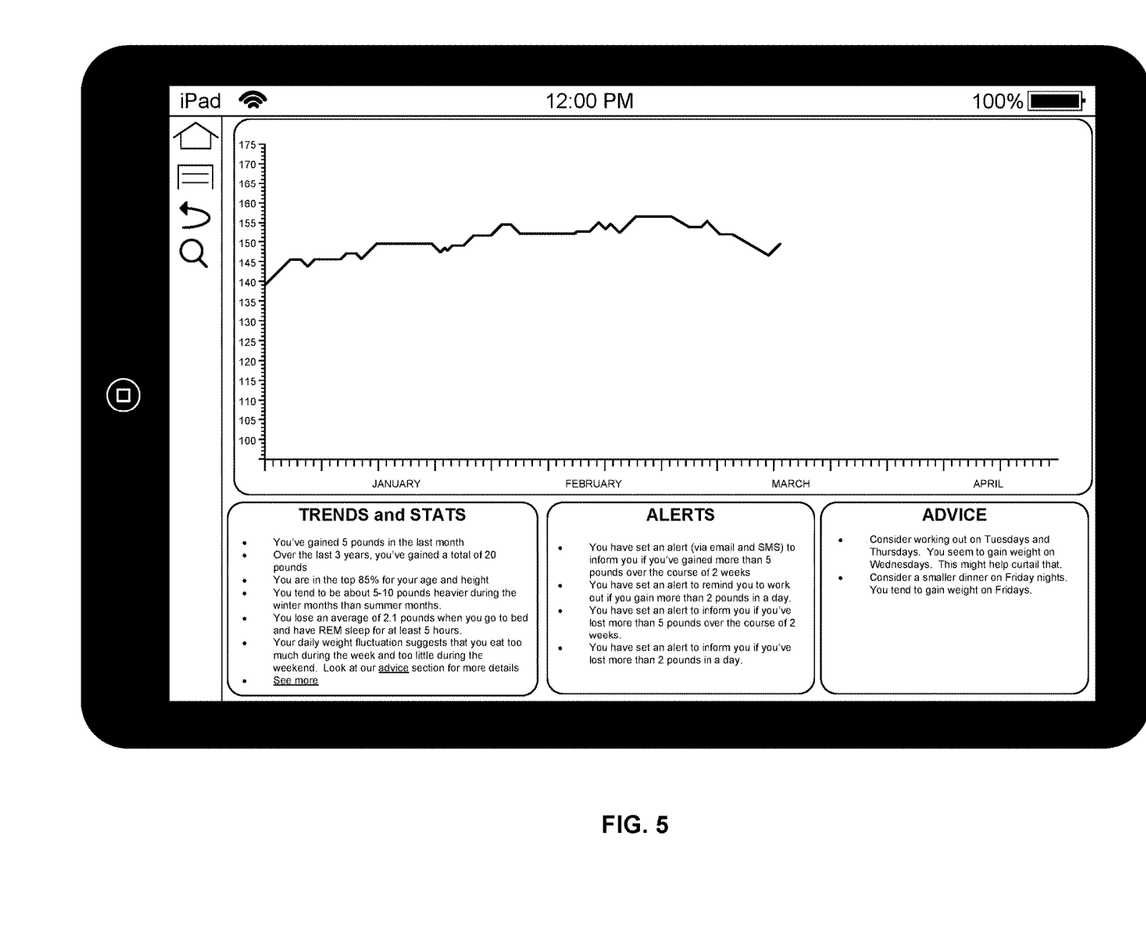
FIG. 5 depicts a user interface for an application that receives weight data in accordance with one embodiment of the invention.

FIG. 5 depicts a user interface for an application that receives weight data in accordance with one embodiment of the invention. The user interface of FIG. 5 may be displayed in an application installed on a computing device such as a tablet, smartphone, laptop, desktop or other computer system that communicates with hosted service 300 or may be displayed in a web application running on hosted service 300 that is accessible through a web browser running on any of the foregoing. Hosted service 300 performs all the analytics and other computing needed to provide the information that the user interface of FIG. 5 displays to the individual. As depicted in FIG. 5, user interface 500 depicts a historic trends and statistics of weight measurements for an individual. While the granularity of the weight measurements is shown as a daily measurement, embodiments of user interface 500 may enable an individual to change the granularity (e.g., weekly, monthly, etc.), for example, to view trends at different granularities. User interface 500 also enables the individual to set alerts to notify the individual (e.g., via text message, email, etc.) if certain criteria related to weight data are recognized. For example, the individual may wish to be alerted if he gains more than 5 pounds over the course of a few weeks. User interface 500 may also identify trends regarding an individual's weight data. For example, user interface 500 has identified a trend that the individual tends to gain weight during the weekdays and also tends to be 5-10 pounds heavier during the winter months. User interface 500 may also provide comparisons of an individual's weight data against similarly situated individuals. For example, user interface 500 has identified that the individual is in the top 85% in weight for persons with similar height and age. In embodiments in which weight data sensor 115 also measures sleep patterns such as REM sleep patterns (or where host server 300 is able to combine such sleep pattern-related data from other devices such as fitness bands that transmit data to host server 300 as previously discussed), user interface 500 may also combine actual weight data with such other data to provide trends and/or statistics relating to a combination of the data. For example, as depicted in FIG. 5, hosted service 300 recognizes that the individual loses an average of 2.1 pounds when the individual has at least 5 hours of REM sleep in a night. The embodiment of FIG. 5 also provides advice to the individual regarding his weight depending upon the weight data trends and the statistics, for example, encouraging the individual to exercise on certain days or eat light meals on certain days given weight gain patterns. It should be recognized that the user interface of FIG. 5 is merely exemplary and many other user interfaces may be developed consistent with the teachings herein.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

I claim:

1. A method for tracking the weight of an individual who may be lying in a bed comprising the steps of:
    periodically receiving, at a hosted service located remote from the bed, weight data from a weight data sensor that is situated within the bed when the weight data sensor recognizes a change in weight on the bed from a default weight of the bed;
    periodically receiving, at the hosted service, other health-related data from a fitness device of the individual while the hosted service is periodically receiving the received weight data;
    determining whether the received weight data is unrelated to the weight of the individual by comparing the received other health-related data to past measurements of the other health-related data that correspond to past weight measurements of the individual;
    disregarding the received weight data if the received weight data is determined to be unrelated to the weight of the individual; and
    providing to the individual a user interface to track weight patterns of the individual based on the received weight data.

2. The method of claim 1 further comprising determining stabilized weight measurements for particular points in time based on weight measurements taken by the weight data sensor.

3. The method of claim 2, wherein the weight measurements are the received weight data and the step of determining stabilized weight measurements is performed by a the hosted service based on the periodically received the weight data.

4. The method of claim 2, wherein the step of determining stabilized weight measurements is performed by the weight data sensor and the periodically received weight data are the stabilized weight measurements.

5. The method of claim 1, wherein the other health-related data comprises at least one of heart rate, body temperature, ambient temperature, calories burned, steps walked, sleep patterns, and location-based data.

6. The method of claim 1, wherein the user interface is an application installed on a device of the individual or a web application provided by the hosted service that is accessible by a web browser.

7. The method of claim 1, wherein the weight data sensor is integrated into a mattress of the bed.

8. The method of claim 7, wherein the mattress is an air mattress and the weight data sensor detects changes in the pressure of an air chamber mechanism for the air mattress.

9. The method of claim 1, wherein the weight data sensor is an insert that is placed under a mattress of the bed.

10. The method of claim 1, wherein the weight data sensor includes wireless communication capabilities to periodically transmit the weight data to a remote hosted service.

11. The method of claim 1, wherein the user interface provides trends or statistics on the individual's weight patterns.

12. The method of claim 11, wherein the user interface further provides an ability set alerts for the individual to receive if the individual gains or loses weight.

13. The method of claim 11, wherein the user interface further provides advice to the individual regarding weight.

14. The method of claim 11, wherein the user interface further provides trends or statistics based on a combination of the individual's weight patterns and other health-related data of the individual.

15. A system for tracking the weight of an individual who may be lying in a bed comprising:
    a weight data sensor for receiving weight data from the individual lying in bed, wherein a form of the weight data sensor is designed to be situated within the bed and the weight data sensor is configured to measure and transmit the weight data on a periodic basis when the weight on the bed differs from a default weight of the bed;
    a fitness device of the individual for receiving other health-related data of the individual; and
    a remote server configured to (i) receive the weight data from the weight sensor, (ii) receive the other health-related data of the individual from the fitness device, wherein the other health-related data comprises at least one of heart rate, body temperature, ambient temperature, calories burned, steps walked, sleep patterns, and location-based data, (iii) determine whether the received weight data is unrelated to the weight of the individual by comparing the received other health-related data to past measurements of the other health-related data that correspond to past weight measurements of the individual, (iv) disregard the received weight data if the received weight data is determined to be unrelated to the weight of the individual, and (v) present a user interface to the individual to track weight patterns of the individual based on the received weight data.

16. The system of claim 15, wherein the weight data sensor is integrated into a mattress of the bed.

17. A method for tracking the weight of an individual who may be lying in bed comprising the steps of:
    receiving weight data from a weight data sensor that is situated within the bed when the weight data sensor recognizes a change in weight on the bed from a default weight of the bed;
    determining, by the weight data sensor, whether a fitness device of the individual is proximate to the weight data sensor by confirming that the fitness device is actively taking measurements of other health-related data of the individual;
    disregarding the received weight data if the fitness device is not proximate to the weight data sensor; and
    if the fitness device is proximate to the weight data sensor and is actively taking measurements of other health-related data of the individual, transmitting the received weight data to a hosted service configured to store the received weight data and provide a user interface to track weight patterns of the individual based on the received weight data.

18. The method of claim 17, wherein the other health-related data comprises at least one of heart rate, body temperature, ambient temperature, calories burned, steps walked, sleep patterns, and location-based data.

19. The method of claim 18, further comprising disregarding the received weight data at the hosted service if the received weight data is inconsistent with historic weight and other health-related data stored at the hosted service.

20. The method of claim 17, wherein the device is a smartphone of the individual and the transmitting step occurs through an application on the smartphone that access the hosted service and displays the user interface.

* * * * *